United States Patent [19]
Imai

[11] Patent Number: 4,999,257
[45] Date of Patent: Mar. 12, 1991

[54] BEARING MATERIAL FOR AN INTERNAL COMBUSTION ENGINE AND COMPRESSOR

[75] Inventor: Kiyoshi Imai, Chiba, Japan

[73] Assignee: NDC Company Ltd., Tokyo, Japan

[21] Appl. No.: 304,447

[22] Filed: Feb. 1, 1989

[51] Int. Cl.$^5$ .............................................. B22F 7/04
[52] U.S. Cl. .................................. 428/555; 428/557; 428/668; 428/677; 419/8
[58] Field of Search .............. 428/546, 561, 555, 557, 428/668, 677; 419/8, 9; 75/200

[56] References Cited
U.S. PATENT DOCUMENTS 4,000,982 1/1977 Veda ................................. 29/182.3
4,002,472 1/1977 Le Brasse et al. ..................... 75/208
4,818,628 4/1989 Alexander et al. ................. 428/561
4,904,537 2/1990 Lytwynec ........................... 428/548

Primary Examiner—Stephen J. Lechert, Jr.
Assistant Examiner—N. Bhat
Attorney, Agent, or Firm—Sughrue, Mion, Zinn, Macpeak & Seas

[57] ABSTRACT

The Cu system bearing material is disclosed, which comprises a backing material consisting of a steel strip, a sintered alloy layer formed on the backing material by sintering metal or alloy particles, and a bearing layer formed on the sintered alloy layer. The sintered alloy layer consists of a sintered alloy containing 14% to 20% by weight of Pb and 4% to 10% by weight of Sn with the remainder being Cu. This bearing material exhibits satisfactory fatigue strength and a wear-resistant property under high-load high-frictional-speed conditions.

4 Claims, 3 Drawing Sheets

BEARING MATERIAL FOR AN INTERNAL COMBUSTION ENGINE AND COMPRESSOR

BACKGROUND OF THE INVENTION

Heretofore, plain bearings are have been used to support journalled portions and frictional portions of internal combustion engines and compressors of vehicles, ships, etc. By the term "plain bearing" is meant a frictional bearing member such as a journal bearing or thrust washer, and the bearing material used for the plain bearing is required to have, an embedding property, or embeddability fatigue strength, a load resistant property, a friction-resistant property, and a wear-resistant property. In the usual bearing material, a bearing layer constituting a bearing surface, which supports a journal or the like, is formed on a backing material consisting of a strip of soft steel or like material, and one or more intermediate layers are provided between the bearing layer as a surface layer and backing material. The intermediate layers are formed either by a casting process or a sintering process, and they are classified in view of the material into those consisting of copper or copper alloys (hereinafter referred to as the Cu system), and those consisting of aluminum or aluminum alloys (hereinafter referred to as Al system). Bearing materials which include an Al system bearing layer (hereinafter referred to as Al system bearing materials) are lighter in weight than, and economically very superior to, those with Cu system bearing and/or intermediate layers (hereinafter referred to as Cu system bearing materials), so that they are used extensively for journal bearings of automotive internal combustion engines. Recently, however, there have been demands for size reduction and an output increase of automotive internal combustion engines, and particularly, exhaust gas purifiers have been provided to cope with pollution problems. Therefore, the bearing materials more frequently are used under higher loads at higher frictional speed, and at higher temperature. For this reason, Cu system bearing materials are used again in lieu of Al system bearing materials.

The Cu system bearing material, produced either by casting or by sintering, is based on what is commonly termed bronze alloy, which contains Sn incorporated into Cu as the principal component. The matrix of the bronze alloy is superior in the load-resistant property and the wear-resistant property, and these superior properties are utilized for the bearing material.

More particularly, the prior art Cu system bearing material based on bronze alloy contains up to about 30% of Sn. If its Sn content is up to about 14%, it is in a range of δ-solid solution, and the matrices are generally in the form of $\alpha + \delta$ crystals. Due to this structure, the bronze alloy is superior in the load-resistant property and the wear-resistant property.

In addition to these properties, however, the bearing material should have other improved properties such as a lubrication property. For this reason, Pb is added in a range of about 20% to 30% in addition to Sn. However, Pb and Cu can form a solid solution in only a very slight range, and seldom will form any solid solution. Therefore, the added Pb is precipitated in the form of spheres or masses in the bronze alloy matrix. Besides, the masses of Pb are united with one another to form continuous bodies. When external forces or loads act repeatedly on the Cu system bearing material as bearing, the material is liable to be broken along continuous bodies. In addition, it is liable to be corroded by the lubricant. Thus, the fatigue-resistant property and the corrosion-resistant property are weakened considerably.

There have been proposed Sn- and Pb-containing Cu system bearing materials which are improved to overcome the drawbacks due to the addition of Pb.

For example, U.S. Pat. No. 3,180,008 discloses a bearing material, in which a multi-layer structure of copper alloy consisting of intermediate and bearing layers is formed on a backing material of soft steel. The multi-layer structure is formed by casting. The surface layer of the multi-layer structure serving as a bearing layer is a lead alloy layer containing, 2% to 10% of In and selectively containing 0.1% to 3% of Cu, 0.001% to 0.25% of Te, 0.5% or less of Ag and/or 0.5% or less of Sb, and the remainder being Pb, while the intermediate layer of the multi-layer structure is a copper alloy layer containg 5% to 35% of Pb and 20% or less of Sn, and the remainder being Cu. In this bearing material, In of the surface bearing layer partly enters the intermediate layer to be coupled to Cu so as to form a Cu-In alloy, thus improving the anti-abrasion while it also is coupled partly to Pb to improve the frictional property. Further, at the time of the disordering operation, when the intermediate layer is exposed partly or totally due to breakage of the bearing layer, the intermediate layer exhibits a bearing function for its matrices having a bronze alloy structure and contain precipitated Pb as the lubricant component. However, the multi-layer structure consisting of the bearing and intermediate layers is fabricated by a casting process. More particularly, the backing material is bent so as to have its opposite edges folded in the shape of a canal, then heating the backing material in, for instance, a reducing atmosphere at about 1,100° C., then forming a casting of melted copper alloy as the intermediate layer on the backing material, and then quenching the system. This is followed by forming a casting of melted lead alloy as the surface layer subsequent to similar heating, and then quenching the system, followed by cutting apart the opposite edges of the backing material. This process of fabrication requires processing of the backing material and repeated casting and quenching, so that it is greatly cumbersome, and the yield is reduced greatly. Besides, the bearing layer of the half bearing, which is formed by working the bearing material, contains Pb, which contains a comparatively large amount of expensive In, so that this bearing material is economically inferior.

U.S. Pat. No. 4,406,857, British Patent No. 658,335 and Japanese Patent Disclosure No. 94,501/1982 disclose Cu system bearing materials, in which bearing and intermediate layers are formed by sintering.

In the bearing material disclosed in the U.S. Pat. No. 4,406,857, a sintered alloy layer containing 8% to 27% of Pb, 0.5% to 10% of Sn, 2% to 10% of Ni, and the remainder being Cu, is formed as a bearing layer or intermediate layer on a backing material consisting of a steel sheet strip.

The matrix of the sintered alloy layer of this bearing material has a bronze structure, in which Cu and Sn form a solid solution, and Pb is dispersed in the matrix. However, the structure is not a cast structure but a sintered structure. Therefore, the adhesion between the alloy layer and backing material is inferior, and Pb is liable to form continuous bodies. By adding Ni, however, the Pb continuous bodies are broken, while Ni forms a solid solution in the matrix, thus improving the mechanical strength. Nevertheless, this bearing material is very expensive for it contains 2% to 10% of expensive Ni. In addition, although Pb continuous bodies are broken, the fatigue strength is not improved much.

In the Cu system bearing material disclosed in British Patent No. 658,335, a Cu alloy layer is formed as a sintered layer on a backing material. In the sintered alloy layer of this material, a portion close to the backing material has as high a content as 4% to 11% of Sn, while the other portion of the bearing surface has as low a content as 1.5% or less of Sn. With this bearing material, Sn is dispersed in the sintered alloy layer portion close to the backing material to increase the adhesion between the alloy layer and the backing material. However, it is cumbersome to vary the Sn content in the thickness direction of the sintered alloy layer. In addition, Pb which does not form any solid solution with Cu, forms continuous bodies, so that the fatigue strength is inferior.

The Cu bearing material disclosed in Japanese Patent disclosure No. 94,501-1982 contains a sintered alloy layer containing 1% to 5% or less by weight of Ni and 0.5% to 3% or less by weight of Sb as well as 8% to 20% or less by weight of Pb and 4% to 10% by weight of Sn, with the remainder being Cu. In this bearing material, Sb is incorporated, with Ni in order to break continuous bodies of Pb which does not form any solid solution with Cu, so as to improve the bearing performance. However, Ni and Sb additions are very expensive, and deteriorate the embedding property or embeddability and these elements have to be added in comparatively large amounts if satisfactory yield is to be obtained. Therefore, this bearing material is inferior in economy.

SUMMARY OF THE INVENTION

The present invention seeks to provide a bearing material, in which a sintered alloy layer is formed by sintering metal or alloy particles on a steel strip backing material, and a bearing layer is formed on this sintered alloy layer. The sintered alloy layer as the intermediate layer contains 14% to 20% by weight of Pb and 4% to 10% by weight of Sn, with the remainder being only Cu.

The sintered alloy layer thus does not contain any added elements other than Sn and Pb, so that it is superior in economy. In addition, Sn which is incorporated in a large amount promotes bronzation, and has an effect of reinforcing the matrices. It is thus possible to enhance the friction-resistant property, the fatigue strength, and the corrosion-resistant property, thus improving the bearing performance. Further, since Pb is incorporated in a comparatively small amount, Pb particles are accurately dispersed and precipitated, so that it is possible to enhance the lubrication property without decreasing the fatigue strength.

Furthermore, since the bearing layer is supported by the sintered alloy layer having the above properties, even if it is formed as a plating alloy layer, a sufficient lubrication property can be maintained as well as initial affinity.

Moreover, if a cover layer consisting solely of Cu is formed on the surface of the backing material, Cu in the cover layer and Cu-Sn alloy matrices in the sintered layer are sufficiently dispersed to enhance the adhesion between the backing material and the sintered alloy layer.

Sintering the intermediate layer consisting of sintered alloy at a temperature lower than that of the prior sintering process prevents Pb particle precipitates forming in a large mass, so that precipitation of fine Pb particles in the matrix can be obtained.

DESCRIPTION OF THE PREFERRED EMBODIMENT

Figure 1:
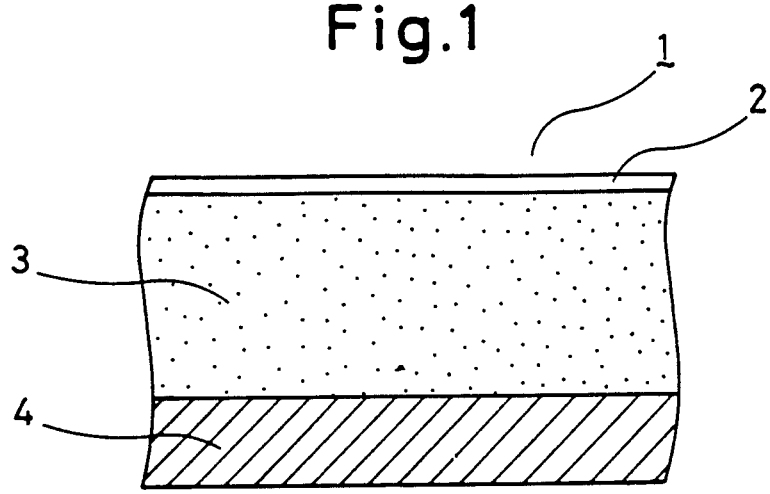
FIG. 1 is a sectional view showing an embodiment of the bearing material according to the invention.

Referring to FIG. 1, reference numeral 1 generally designates a bearing material as an embodiment of the invention, which comprises a surface bearing layer 2, an intermediate sintered alloy layer 3, and a backing material 4. The bearing layer 2 is a very thin plating alloy layer containing Pb and/or Sn, and it supports a counterpart member such as a journal section. The sintered alloy layer 3 is formed integrally on the backing material 4 by sintering metal or alloy particles, and it contains 14% to 20% of Pb and 4 to 10% of Sn, with the remainder being Cu. Although Pb, Sn, and Cu may be incorporated as their respective element particles, they also may be incorporated as their alloy particles, for instance as Cu-Sn alloy particles.

Such particles are sprayed on the steel strip backing material, and are sintered under pressure in a reducing atmosphere at a temperature of 750° C. to 800° C. By so doing, a bearing material with the sintered alloy layer 3 formed on the backing material 4 can be obtained.

The above limitations of the Sn and Pb contents of the sintered alloy layer are given for the following reasons.

Sn forms a solid solution with Cu to form a bronze structure. This bronze structure has an effect of increasing the mechanical strength, and also its properties have an effect of improving the corrosion-resistant of the matrices. From these standpoints, Sn is incorporated preferably as much as possible. If Sn content is excessive, however, it does not form 8-phase a solid solution with Cu without forming a-phase, resulting in the formation of undesired excessively hard matrices. According to the invention, in order to meet the recent demand for increased output of internal combustion engines and the like, Sn is incorporated in a large amount as compared to the prior art so that it forms a solid solution with Cu, thus increasing the mechanical strength such as hardness of matrices, tensile strength, and shearing strength as well as improving the corrosion-resistant property.

To this end, Sn should be added by 4% or more. Particularly, Sn should be incorporated by 4% or more above in order to maintain the seizure-resistant property even when the Pb content is reduced. If the Sn content exceeds 10%, the matrices are too hard. For the above reasons, Sn content is set to be in a range of 4% to 10%.

Pb is added in a range of 14% to 20%. It is said that Pb is added preferably as much as possible in order to improve the lubrication and seizure-resistant properties, and to provide satisfactory bearing properties. By way of example, the SAE Standards 48, 49, 794, and 799 prescribe that the bearing material should contain as much Pb as 21% to 32%. However, when such a large amount of Pb is incorporated, matrices are broken, resulting in the deterioration of the fatigue strength. Therefore, incorporation of such a large amount of Pb is not suitable for. On the other hand, if the Pb content is reduced excessively, the lubrication property is lessened thereby to increase the possibility of seizure.

The inventors conducted a detailed study of the frictional and lubricating mechanisms of bearing materials and found that the bearing material should meet the following requirements listed below.

(a). Where a bearing layer consisting of a plating layer of a metal or an alloy is formed on the sintered alloy layer, the initial affinity between the bearing material and the journal support thereby is provided by this surface bearing layer. Where the life of the bearing layer itself can be maintained not only initially but for a long time, sufficient bearing performance should be maintained due to the presence of the bearing layer.

(b). If the bearing layer can be maintained long by the sintered alloy layer, the sintered alloy layer provides for enhanced bearing performance in cooperation with the surface bearing layer. As a requirement, it should be possible to enhance the hardness of the sintered alloy layer to a certain extent, and also let the bearing layer be held firmly by the sintered alloy layer.

(c). Satisfactory bearing performance of the bearing material cannot be attained merely by the lubrication property being enhanced by adding Pb other lubricating components, but it can be attained only when all properties, such as hardness, wear resistance, fatigue strength, and load-resistant as well as a lubricating property can be obtained at the same time.

(d). Ni and Sb additions are not favorable due to an increase in the cost of the bearing material and a deterioration of capability permissible to embed hard obstacles from the counterpart journal or the like.

Compositions which can meet the above requirements have been investigated, and it is found the requirments can be sufficiently met by a composition, which incorporates only Sn and Pb, with the remainder being Cu. More specifically, Sn which forms a solid solution with Cu, is incorporated comparatively greatly, i.e., in a range of 4% to 10% as noted above, to improve the hardness of matrices by bronzation thereof to be about HRT 15T 80 above a prior art, example value of HRT 15T 60, thus enhancing the load-resistant property. By so doing, even if the surface bearing layer is a thin plating layer, it is held firmly and soundly by the sintered alloy layer, so that enhanced bearing performance can be obtained.

In addition, even if the content of Pb in the sintered alloy layer is reduced to a range of 14% to 20% at the same time, it is possible to maintain a lubrication property which is substantially comparable to that when an as great amount as 21% to 32% of Pb is added owing to the fact that the surface plating layer as bearing layer has a long life. Actually, substantially no difference can be recognized in the threshold seizure load in friction/wear tests.

Further, in the event of exposure of the surface of the sintered alloy layer due to occasional wear or breakage of the surface bearing layer, Pb is dispersion precipitated, and never forms continuous bodies in matrices so long as it is incorporated in a range of about 14% to 20% and no other additive component is incorporated. Thus, the fatigue strength is improved greatly there to improve the bearing performance.

More specifically, the fatigue strength is influenced by the framework of the matrix. The framework of the matrix is never broken by precipitated Pb particles in it, and matrices are held coupled together. Thus, the fatigue strength can be enhanced. If Pb is incorporated in a range of 21% to 32% as in the prior art, it forms continuous bodies to break the framework of matrix. In addition, if dispersion of its fine particles is imperfect, Pb forms particles in the form of masses to give rise to fatigue fissures.

According to the invention, Pb is incorporated in a comparatively small amount of 14% to 20%, preferably 14% to 18%, so that precipitated Pb particles hardly form continuous bodies, and also they are dispersed finely. Thus, the fatigue strength of the sintered alloy layer is extremely increased, and the bearing layer can be held firmly and soundly even if it experiences externally applied shocks. Further, even if the sintered alloy layer is exposed due to disappearance of the bearing layer, it is possible to maintain improved fatigue strength, hardness, a wear resistant property, and a load resistant property owing to the reinforcement of the matrix itself in addition to an improved lubrication property owing to the presence of 14% to 20% of Pb. Hence, improved bearing performance can be maintained.

Figure 2:
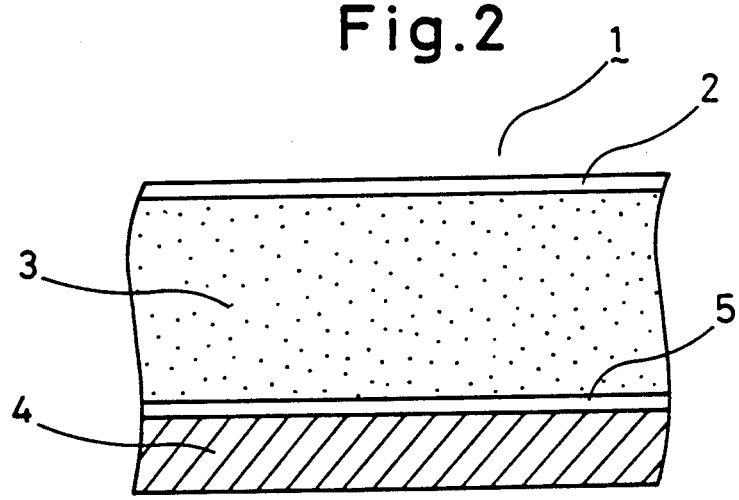
FIG. 2 is a sectional view showing a different embodiment of the bearing material.

To improve the bearing performance, it is desirable to enhance the adhesion between the sintered alloy layer 3 and backing material 4 in addition to reinforcing the sintered alloy layer 3. The adhesion is suitably enhanced by forming a cover layer 5 substantially consisting solely of Cu by means of plating on the surface of the backing material 4, as shown in FIG. 2. Namely, the cover layer 5 consists only of Cu and does not contain other elements except Cu. Therefore, during the sintering process, mutual entrance of Cu between layers 3 and 5 occurs, but any transference of other elements from layer 5 to layer 3 does not occur. Consequently, an enhanced bonding between layers 5 and 3 can be obtained, without obtaining a boundary between layers 3 and 5 to embed some obstacles generated at the counterpart journal into the sintered alloy layer 3.

In summary, the embeddability of the sintered alloy layer 3, especially that of the boundary between layers 3 and 5, depends upon the chemical constituents of the covering layer 5, as well as that of the sintered alloy layer 3.

EXAMPLE 1

Figure 3:
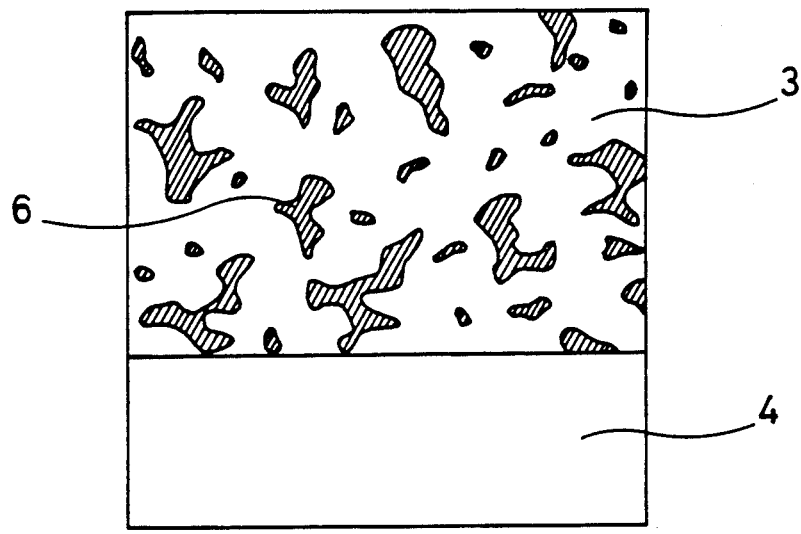
FIG. 3 is a view for explaining the structure of a sintered alloy layer in the bearing material shown in FIG. 1.

After cleaning the surface of a backing material consisting of a soft steel strip, metal and alloy particles containing 18% of Pb and 5% of Sn, with the remainder being Cu, were sprayed on the cleaned surface and heated for sintering to obtain a sintered layer on, and integral with, the backing material. The sintered layer then was pressed with a roller to increase its density. A sintered alloy layer was formed on, and integral with, the steel strip backing material in a reducing atmosphere at 750° C. to 800° C. This bearing material was used after forming a Pb-Sn plating layer on the sintered alloy layer. FIG. 3 shows an enlarged-scale photograph of a section of the bearing layer.

Figure 4:
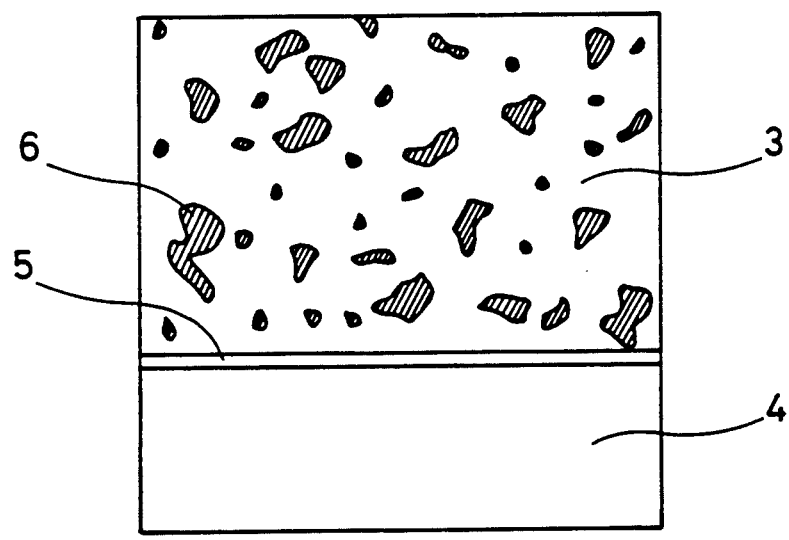
FIG. 4 is a view for explaining the structure of a sintered alloy layer in the bearing material shown in FIG. 2.

A sintered alloy layer having the same composition was formed on a soft steel strip backing material. In this case, a cover layer (3 microns thickness) substantially consisting solely of Cu was formed by plating on the surface of the backing material. The sintering in reducing atmosphere was performed at 700° C. to 750° C., i.e., at a temperature 50° C. lower than the temperature in the first-mentioned case. FIG. 4 shows an enlarged scale photograph of a section of this bearing material.

Figure 5:
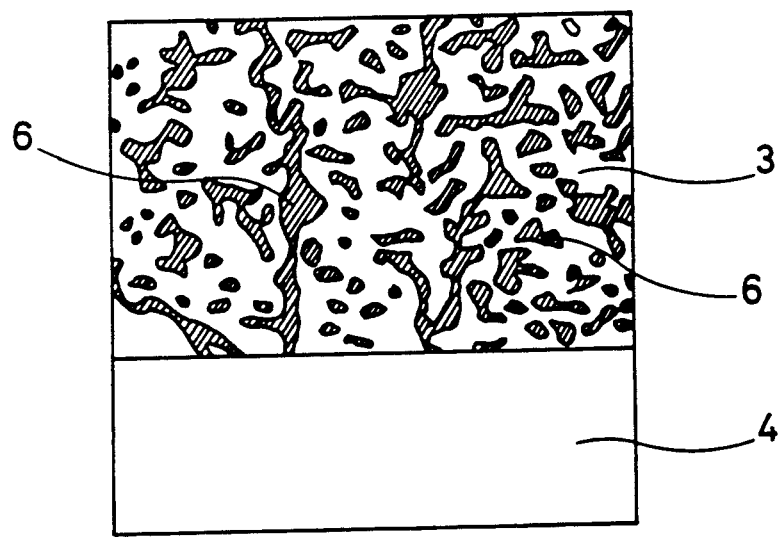
FIG. 5 is a view for explaining the structure of a sintered alloy in a prior art bearing material.

The bearing materials shown in FIGS. 3 and 4 are according to the invention. As a contrast, a bearing material, in which a sintered alloy layer containing 25% of Pb and 1.5% of Sn, with the remainder being Cu, was formed on a steel strip backing material, was fabricated. FIG. 5 shows an enlarged scale photograph of a section of the bearing material.

In FIGS. 3 to 5, like FIGS. 1 and 2, reference numeral 3 designates a sintered alloy layer, 4 a backing material, and 5 a cover layer.

Plain split bearings were fabricated using the bearing materials shown in FIGS. 3 and 4 according to the invention and prior art bearing material shown in FIG. 5, and durability tests were conducted on these bearing material samples.

The tests were conducted using an underwood tester and under the following conditions to obtain the time until occurrence of metal fatigue and also the proportion of test pieces, with which the metal fatigue occurred, among the entire tested pieces.

| Durability Test Conditions | |
| --- | --- |
| Bearing surface pressure: | 700 kg/cm² |
| Oil Clearance: | 30 to 50 μm |
| Revolving rate of shaft: | 3,500 rpm |
| Material of Shaft: | S 45 C |
| Lubricant: | SAE 20W-40 |

Table 1 below shows the results of tests.

TABLE 1

| Durability time (Hrs) | 20 | 40 | 60 | 80 | 100 | 120 | 140 | 160 | 180 | 200 |
| --- | --- | --- | --- | --- | --- | --- | --- | --- | --- | --- |
| Ratio of successful pieces (in %) | | | | | | | | | | |
| Invention | | | | | | | | | | |
| Without Cu cover layer | 100 | 100 | 100 | 100 | 80 | 80 | 80 | 80 | 80 | 60 |
| With Cu cover layer | 100 | 100 | 100 | 100 | 100 | 80 | 80 | 80 | 80 | 70 |
| Prior Art | | | | | | | | | | |
| | 86 | 86 | 86 | 86 | 86 | 75 | 58 | 50 | 40 | 40 |

In Table 1, the ratio of successful pieces in % is the ratio of test pieces, in which metal fatigue occurred in each durability time, among the entire test pieces. For example, when the ratio is 80%, metal fatigue occurred with 20% of all the test pieces in the pertinent durability time. It will be seen from Table 1 that the bearing material according to the invention, with or without a Cu plating cover layer, has greatly improved durability compared to the prior art bearing material.

The test pieces in which the metal fatigue occurred in the above test were examined to find that fatigue fissures first occurred on the surface, and then developed to reach the back surface in the close proximity of the backing material. Further, where precipitated Pb particles 6 were continuous or closely spaced apart as shown in FIG. 5, fissures were produced in matrices along Pb particles 6, and these fissures caused separation of the sintered alloy layer from the backing material, or separation of the bearing layer formed by plating as described below.

With the bearing materials according to the invention, in contrast, Pb particles 6 are dispersed to provide for a suitable lubrication property, and are not coupled together but adequately spaced apart in matrices, thus making metal fatigue difficult and providing for superior durability.

EXAMPLE 2

By plating 10% Sn-3% Cu-87% Pb alloy, a bearing layer 15 to 30 microns in thickness was formed on the surface of each of the three different test pieces fabricated in Example 1, and plain split bearings were fabricated using these bearing materials and subjected to durability test under the same conditions as in Example 1.

Unless metal fatigue occurred in the sintered alloy layer in durability times of 20, 40, 60, 80, 100, 120, 140, 160, 180, and 200 hours, a sufficient lubrication property could be maintained for the bearing layer.

In spite of occurrence of the partial wear on the bearing layer, a fatigue is not ready to occur on the sintered alloy layer.

As a result, good lubrication can be maintained, and an endurance period longer than that of Example 1 can be obtained.

What is claimed is:

1. A copper system bearing material comprising a backing material consisting of a steel strip, a sintered alloy layer formed on said backing material by sintering metal or alloy particles, a bearing layer formed on said sintered alloy layer consisting of a sintered alloy containing 14% to 20% by weight of lead and 4% to 10% by weight of tin, with the remainder being copper, and a copper cover layer consisting of copper formed on the surface of said backing material and serving to bond said backing material and said sintered alloy layer to each other.

2. The copper system bearing material according to claim 1, wherein said bearing layer is a plating layer of an alloy containing lead and/or tin.

3. A copper system bearing material comprising:
    a backing material; and
    a sintered alloy layer formed on at least one surface of said backing material, said sintered alloy layer having a lead content ranging from 14% to 20% by weight and a tin content ranging from 4% to 10% by weight, and the balance being copper, and a copper covering layer, consisting of copper, having a first face strongly bonded to a surface of said backing material and a second face adhering to a first surface of said sintered alloy layer.

4. The copper system bearing material claimed in claim 3, further comprising a bearing layer having a first face bonded to a second surface of said sintered alloy, said bearing layer being a plating layer of a copper-lead-tin alloy.

* * * * *